(12) United States Patent
Shan et al.

(10) Patent No.: US 7,797,184 B2
(45) Date of Patent: Sep. 14, 2010

(54) METHODS AND SYSTEMS FOR CUMULATIVE ATTRIBUTE FORECASTING USING A PDF OF A CURRENT-TO-FUTURE VALUE RATIO

(75) Inventors: Jerry Z. Shan, Palo Alto, CA (US); Hsiu-Khuem Tang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1718 days.

(21) Appl. No.: 10/959,861

(22) Filed: Oct. 6, 2004

(65) Prior Publication Data

US 2006/0074817 A1    Apr. 6, 2006

(51) Int. Cl.
    *G06F 17/30* (2006.01)
(52) U.S. Cl. .................................................. 705/10
(58) Field of Classification Search ................ 705/7, 705/10
    See application file for complete search history.

(56) References Cited

U.S. PATENT DOCUMENTS

| | | | |
|---|---|---|---|
| 6,314,204 B1 * | 11/2001 | Cham et al. | 382/228 |
| 7,319,972 B2 * | 1/2008 | von Gonten et al. | 705/10 |
| 7,454,377 B1 * | 11/2008 | Beaumont | 705/36 T |
| 2003/0014349 A1 | 1/2003 | Guler et al. | |
| 2003/0033190 A1 | 2/2003 | Shan et al. | |
| 2003/0120580 A1 * | 6/2003 | Ikeda et al. | 705/36 |
| 2005/0033678 A1 * | 2/2005 | Huneault | 705/36 |
| 2005/0080661 A1 | 4/2005 | Casati et al. | |
| 2005/0091141 A1 | 4/2005 | Guler et al. | |

OTHER PUBLICATIONS

Frances (Forecasting in Marketing) Aug. 2004, Econometric Institute Report, EI 2004-40, pp. 1-40.*
Malik et al "Probability Density Function of the Product and Quotient of two Correlated Exponential Random Variables", Dec. 1986, Canad. Math. Bull. vol. 29(4), pp. 1-6.*
J. Z. Shan et al., "Method and System for Predicting Revenue based on Historical Pattern Identification and Modeling," U.S. Appl. No. 10/322,201, filed Dec. 17, 2002, 28 pp.
J. Shan, "Method and System for Constructing Prediction Interval Based on Historical Forecast Errors," U.S. Appl. No. 10/355,353, filed Jan. 31, 2003, 25 pp.
J. Z. Shan, "Methods and Systems for Forecasting with Model-Based PDF Estimates," U.S. Appl. No. 11/001,453, filed Dec. 1, 2004, 29 pp.

(Continued)

*Primary Examiner*—Romain Jeanty (57) ABSTRACT

Systems and methods are disclosed for cumulative attribute forecasting using a probability density function of a current-to-future value ratio. Some method embodiments may comprise determining an unconditional probability density function for a ratio of a cumulative attribute's current value to an associated future value for the cumulative attribute, and determining an unconditional PDF for a future value of the cumulative attribute. The unconditional probability functions are combined with a current value of the cumulative attribute in a manner that yields a conditional probability density function for the future value. The conditional probability density function may then be used to determine forecasts such as a most likely future value, a mean value, a median value, a confidence interval for the future value, and a probability of achieving a future value within some specified range.

23 Claims, 3 Drawing Sheets

OTHER PUBLICATIONS

J. Z. Shan, "Methods and Systems for Profile-Based Forecasting with Dynamic Profile Selection," U.S. Appl. No. 11/001,455, filed Dec. 1, 2004, 25 pp.

J. Z. Shan, "Methods and Systems for Identifying Recurrent Patterns," U.S. Appl. No. 11/001,458, filed Dec. 1, 2004, 17 pp.

Wikipedia article, "probability density function," http://en.wikipedia.org, last updated Jul. 12, 2009.

Bayesian Interval Estimation, http://www.math.uah.edu, accessed from Internet Jul. 16, 2009.

S. Thomas, "Session 2: Probability distributions and density functions," http://www.igidr.ac.in/~susant, accessed from Internet Jul. 16, 2009.

* cited by examiner

METHODS AND SYSTEMS FOR CUMULATIVE ATTRIBUTE FORECASTING USING A PDF OF A CURRENT-TO-FUTURE VALUE RATIO

BACKGROUND

Commercial enterprises compete for customers by promising, among other things, low prices and fast delivery. Successful competition often requires careful monitoring of profit margins and deadlines. One key to success in this environment is a system that provides accurate and timely business information. Financial data and other information that indicates the state of the corporation can no longer be examined only on a periodic basis, but rather must be continually monitored. Businesses rely on their latest performance information to support strategic planning and decision making, so any businesses without a system for providing accurate and timely business information would be at a huge disadvantage relative to their competitors.

Accordingly, most businesses track at least their financial data in a computerized financial reporting system that can generate reports on demand. Many large entities have reporting systems that process large numbers of complex transactions which may be occurring at many locations around the world.

Businesses often wish to use such computerized data to forecast some outcome (e.g., end-of-quarter revenue, end-of-month inventory, or end-of-year overhead costs) or to monitor the probability of achieving some goal to support current business decisions. This task may be quite challenging. A large enterprise's ongoing transactions are complex and difficult to model. One alternative to constructing transaction-based models is to employ stochastic modeling techniques for forecasting. Many stochastic modeling approaches are based on time-series models. Autoregressive (AR), moving average (MA), and autoregressive moving average (ARMA) models inherently assume that the data is stationary (in the statistical sense of having a fixed average and standard deviation), which makes them unsuitable for many real world applications. The autoregressive integrated moving average (ARIMA) model weakens the requirement for stationarity, requiring only that the data have a stationary derivative (i.e., a differenced time series that can be integrated to recover the original time series). However, the ARIMA model (and its seasonal variant, SARIMA) has also proven unsatisfactory for many real world applications.

Real world data rarely follows any neat or closed-form stochastic models such as those given by the foregoing time-series models. Though a good correspondence can often be achieved with existing data that is used for training the model, the future predictions made by such models are inadequate for many applications, and degrade when model complexity is increased. An alternative approach to closed-form stochastic models would be desirable for forecasting in the business environment.

SUMMARY

Accordingly, there is disclosed herein systems and methods for cumulative attribute forecasting using a probability density function of a current-to-future value ratio. Some method embodiments may comprise determining an unconditional probability density function for a ratio of a cumulative attribute's current value to an associated future value for the cumulative attribute, and determining an unconditional PDF for a future value of the cumulative attribute. The unconditional probability functions are combined with a current value of the cumulative attribute in a manner that yields a conditional probability density function for the future value. The conditional probability density function may then be used to determine forecasts such as a most likely future value, a confidence interval for the future value, and a probability of achieving a future value within some specified range.

BRIEF DESCRIPTION OF THE DRAWINGS

For a detailed description of illustrative embodiments, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various invention embodiments. The disclosed embodiments should not be interpreted, or otherwise used, as limiting the scope of the disclosure or the claims. In addition, one skilled in the art will understand that the following description has broad application. The discussion of any embodiments is meant only to be illustrative of those embodiments, and is not intended to suggest that the scope of the disclosure or the claims is limited to those embodiments.

Figure 1:
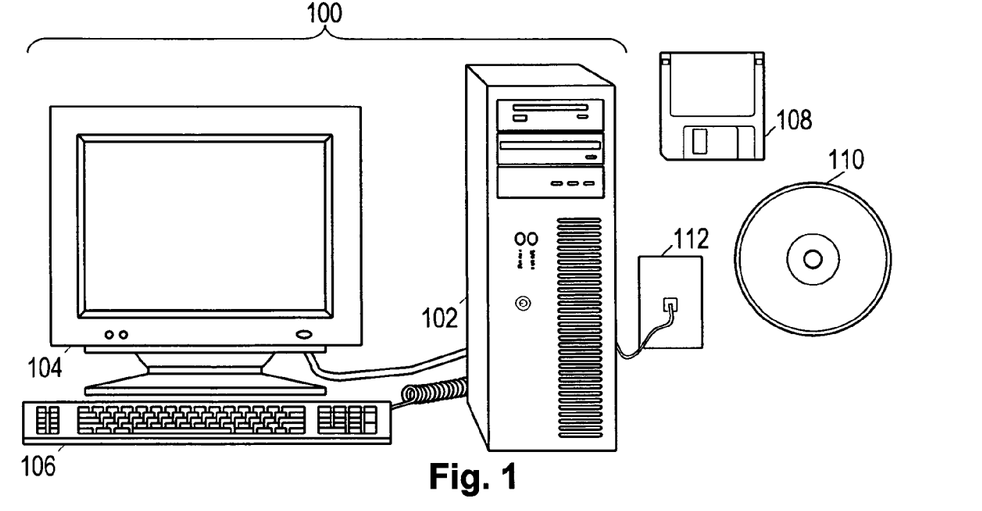
FIG. 1 is a diagram of an illustrative business forecasting system with illustrative information carrier media in accordance with certain embodiments of the invention.

FIG. 1 shows an illustrative system 100 for providing timely business information, comprising accurate forecasts of periodic, cumulative values. System 100 is shown as a desktop computer 100, although any electronic device configured with a graphical user interface and some amount of computing power may be configured to carry out the methods disclosed herein. Among other things, portable computers, personal digital assistants (PDAs) and graphing calculators may be configured to carry out the disclosed methods.

As shown, illustrative system 100 comprises a chassis 102, a display 104, and an input device 106. The chassis 102 comprises a processor, memory, and information storage devices. One or more of the information storage devices may store programs and data on removable storage media such as a floppy disk 108 or an optical disc 110. The chassis 102 may further comprise a network interface that allows the system 100 to receive information via a wired or wireless network, represented in FIG. 1 by a phone jack 112. The information storage media and information transport media (i.e., the networks) are collectively called "information carrier media."

The chassis 102 is coupled to the display 104 and the input device 106 to interact with a user. The display 104 and the input device 106 may together operate as a user interface. The display 104 is shown as a video monitor, but may take many alternative forms such as a printer, a speaker, or other means for communicating information to a user. The input device 106 is shown as a keyboard, but may similarly take many alternative forms such as a button, a mouse, a keypad, a dial, a motion sensor, a camera, a microphone or other means for receiving information from a user. Both the display 104 and the input device 106 may be integrated into the chassis 102.

Figure 2:
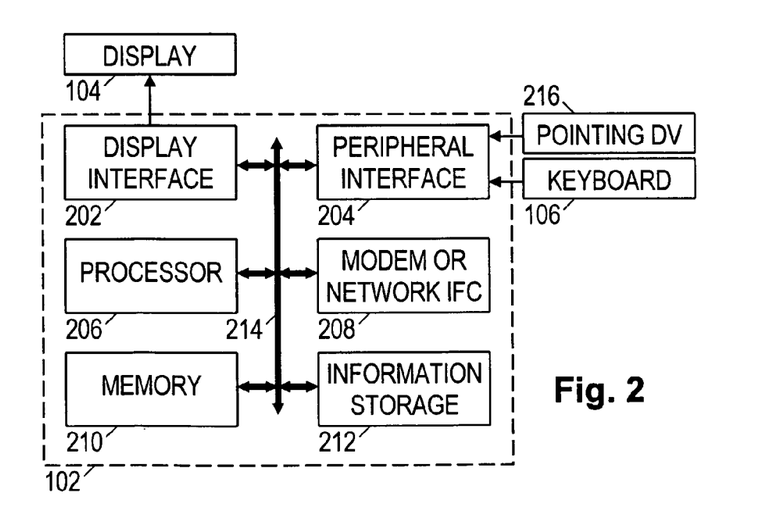
FIG. 2 is a block diagram of the illustrative business forecasting system in accordance with certain embodiments of the invention.

FIG. 2 shows a simplified functional block diagram of system 100. The chassis 102 may comprise a display interface 202, a peripheral interface 204, a processor 206, a modem or other suitable network interface 208, a memory 210, an information storage device 212, and a bus 214. System 100 may be a bus-based computer, with the bus 214 interconnecting the other elements and carrying communications between them. The display interface 202 may take the form of a video card or other suitable display interface that accepts information from the bus 214 and transforms it into a form suitable for the display 104. Conversely, the peripheral interface 204 may accept signals from the keyboard 106 and other input devices such as a pointing device 216, and transform them into a form suitable for communication on the bus 214.

The processor 206 gathers information from other system elements, comprising input data from the peripheral interface 204, program instructions and other data from the memory 210, the information storage device 212, or from a remote location via the network interface 208. The processor 206 carries out the program instructions and processes the data accordingly. The program instructions may further configure the processor 206 to send data to other system elements, comprising information for the user which may be communicated via the display interface 202 and the display 104.

The network interface 208 enables the processor 206 to communicate with remote systems via a network. The memory 210 may serve as a low-latency temporary store of information for the processor 206, and the information storage device 212 may serve as a long term (but high-latency) store of information.

The processor 206, and hence the computer 100 as a whole, operates in accordance with one or more programs stored on the information storage device 212. The processor 206 may copy portions of the programs into the memory 210 for faster access, and may switch between programs or carry out additional programs in response to user actuation of the input device. The additional programs may be retrieved from information the storage device 212 or may be retrieved from remote locations via the network interface 208. One or more of these programs may configure system 100 to carry out at least one of the forecasting methods disclosed herein.

Figure 3:
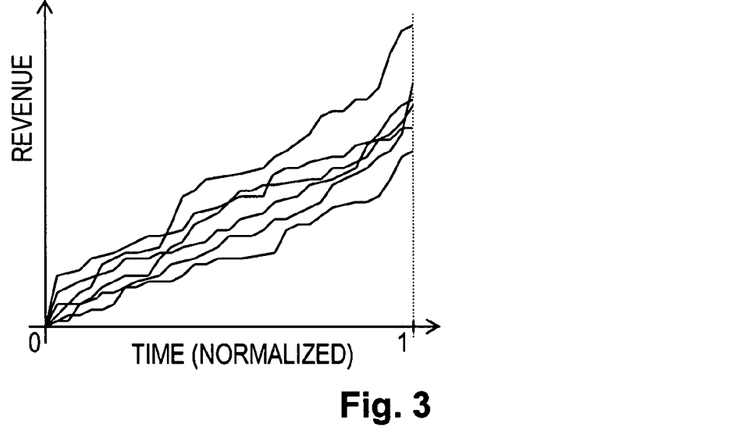
FIG. 3 shows illustrative graphs of cumulative revenue for multiple periods.

FIG. 3 is a graph showing revenue as a function of time for a number of past accounting periods. (The graphs are cumulative functions, but they are not necessarily strictly increasing functions since negative adjustments are possible.) Although revenue is shown, the methods disclosed herein may be applied to any cumulative attribute of a business, such as visits, transactions, sales, inventory, man-hours, costs, revenue, savings, liabilities, quantifiable risks, patents, licensees, customers, product demand, traffic patterns and network usage. The history of the cumulative attribute is divided into time periods such as hours, days, weeks, months, quarters, years, or fiscal periods. The time periods may be fixed in length or they may vary from period to period. In the latter case, the time periods may be normalized before applying the disclosed methods. The choice of time periods may depend on the behavior being analyzed and the expected repetition patterns within such behaviors.

FIG. 3 shows that the cumulative attribute varies from period to period, but there is some commonality to the patterns. The methods disclosed herein exploit this commonality to forecast the end-of-period value based on a current value and knowledge from the preceding periods.

Figure 4A:
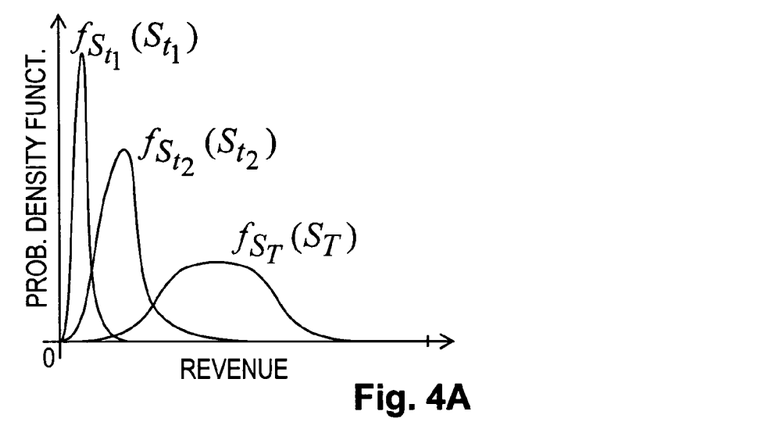
FIG. 4A shows illustrative graphs of unconditional probability density functions for revenue at different times in accordance with certain embodiments of the invention.

In the following discussion, let $S_t$ represent the cumulative attribute as a function of time t as the time ranges from t=0 to the end of the period t=T. The cumulative attribute $S_t$ is a stochastic variable having a probability density function $f_{S_t}(S_t)$ that varies as a function of time. Let $f_{S_T}(S_T)$ represent the probability density function for $S_T$, the value of the cumulative attribute at the end of the period. (It is this end-of-period value that we may wish to forecast.) FIG. 4A shows an illustrative evolution of the probability density function, giving curves at $t=t_1$, $t=t_2$, and $t=T$.

The probability density functions shown in FIG. 4A can be determined from historical data, and a forecast for the end-of-period value can be made using $f_{S_T}(S_T)$. However, FIG. 3 suggests that a more accurate forecast may be possible if intermediate values are available and are taken into account. For example, if at the middle of the period, the current attribute value is near the high end of the range, then the end-of-period value is more likely to be near the high end of the range. Conversely, a low current attribute value makes a low end-of-period value more likely. Accordingly, the following discussion concerns a determination of the conditional probability density function $f(S_T|S_t)$, i.e., the probability distribution for the end-of-period attribute value $S_T$ when the current attribute value $S_t$ is known.

Bayes' formula for a conditional probability gives:

$$f(S_T|S_t) = \frac{f(S_t, S_T)}{f_{S_t}(S_t)}. \quad (1)$$

Unfortunately, the joint probability density function $f(S_t, S_T)$ is difficult to estimate with a limited amount of historical data. However, the joint probability density function can be expressed using Bayes' formula again:

$$f(S_T|S_t) = \frac{f(S_t|S_T)f_{S_T}(S_T)}{f_{S_t}(S_t)}. \quad (2)$$

Equation (2) raises another difficulty, namely, in determining the conditional probability density function on the right-hand side of the equation, the end-of-period value $S_T$ cannot be taken as known until the end of the period, at which point forecasting is unnecessary! Thus equation (2) needs to be revised to eliminate this source of circularity.

Figure 4B:
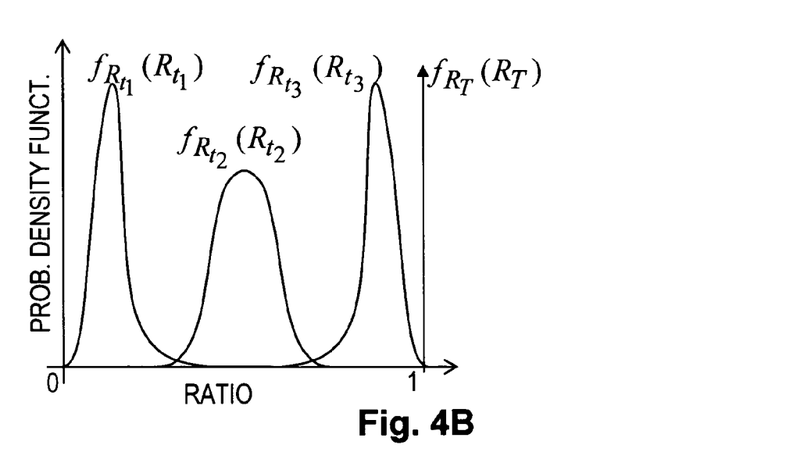
FIG. 4B shows illustrative graphs of unconditional probability density functions for ratios at different times in accordance with certain embodiments of the invention.

The present disclosure exploits a reformulation of the conditional probability density function $f(S_t|S_T)$ as follows:

$$f(S_T|S_t) = \frac{1}{S_T} \frac{f_{R_t}(S_t/S_T) f_{S_T}(S_T)}{f_{S_t}(S_t)}. \tag{4}$$

where the random variable has been scaled to obtain the ratio $R_t = S_t/S_T$. Advantageously, the probability distribution for the ratio $R_t$ (see examples shown in FIG. 4B) has been tested to be practically independent of the end-of-period value $S_t$ in the cumulative attributes considered by the authors. Thus it can be shown that $$f(S_t|S_T) = \frac{1}{S_T} f_{R_t}(R_t|S_T) = \frac{1}{S_T} f_{R_t}(S_t/S_T|S_T), \tag{3}$$

When forecasting, the current attribute value $S_t$ is fixed, so the denominator can be dropped in favor of a proportionality constant, giving:

$$f(S_T|S_t) \propto \frac{1}{S_T} f_{R_t}(S_t/S_T) f_{S_T}(S_T), \tag{5}$$

where $\propto$ represents proportionality. If needed, the proportionality constant can simply be determined by integration since the area under any probability density function is always equal to unity. Note that if the independence requirement between the ratio and the end-of-period value cannot be fully tested and satisfied, one can still use equation (5) for practical purposes, with the understanding that it is an approximation.

In any event, equation (5) provides a relationship that can be used for forecasting an end-of-period attribute value $S_T$ with knowledge of a current attribute value $S_t$, the unconditional probability density function for the ratio $R_t$, and the unconditional probability density function for the end-of-period attribute value $S_T$. Advantageously, these unconditional probability density functions can be divined with only a limited amount of historical information. In situations where historical information is extremely limited, of poor quality, or relevant only to a different situation, a person using this method may simply guess at the probability density functions, using experience and limited information as a guide. One approach to guessing may rely on assuming a Gaussian distribution and guessing at a suitable average and suitable standard deviation.

Figure 5:
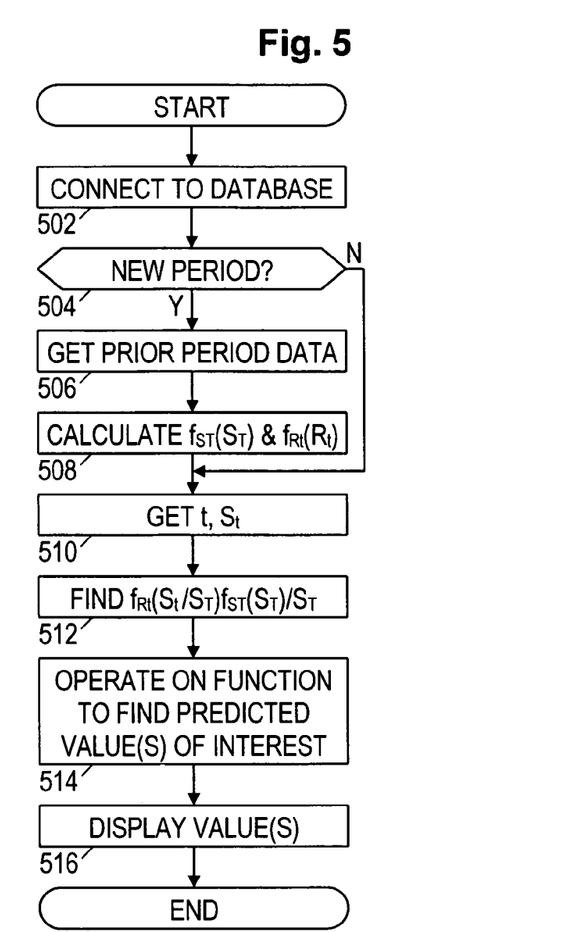
FIG. 5 is a flow diagram of an illustrative forecasting method in accordance with certain embodiments of the invention.

FIG. 5 shows a flow diagram for an illustrative computer-based implementation of a forecasting method. Beginning with block 502, the computer connects to a database having records of the cumulative attribute values for current and past periods. In block 504, the computer determines whether a new period has begun, i.e., whether this execution of the method will be the first forecast for the current period. If so, the computer gathers cumulative attribute data for previous periods in block 506. Otherwise the computer skips to block 510 (discussed further below).

In block 508, the computer determines the unconditional probability density functions for intermediate and end-of-period cumulative attribute values, $f_{R_t}(R_t)$ and $f_{S_T}(S_T)$, respectively. This determination may itself be a multi-step process. In some embodiments, the cumulative attribute values are digital, being continuous or discrete in value and in time. The time scale for each previous period is normalized, and the data is smoothed by fitting a curve to the discrete points. Any curve fitting technique may be used, e.g., a least-squares fit or a LOESS (local polynomial regression fitting) function to determine the average behaviors at each time point. To fully determine the range and its associated distribution at each point, a probability density function is determined at evenly-spaced time intervals (e.g., at all the time points) in the period. In many cases, a Gaussian probability density function may be expected, but this is by no means a requirement. In some cases, a multi-mode distribution may be discovered. In situations where insufficient data is available, the computer may prompt the user for guidance on choosing appropriate probability density functions. In situations where a multitude of information is available, the computer may apply a weighting strategy to favor data from more recent periods.

Before reaching block 510, the computer has completed its determination of unconditional probability density functions based on data from previous periods. In block 510, the computer retrieves the current cumulative attribute value $S_t$ and its associated time t. If the length of the periods is variable, the computer also determines the length of the current period and normalizes t.

In block 512, the computer takes the unconditional probability density functions, the cumulative attribute value, and the time as provided, and evaluates equation (5) for different potential values of $S_T$. This results in a curve such as that shown in FIG. 6.

Figure 6:
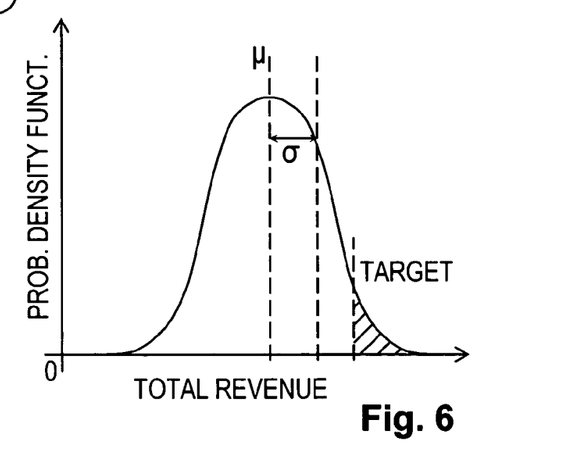
FIG. 6 is a graph of an illustrative conditional probability distribution function derived by certain embodiments of the invention.

In block 514, the computer operates on the curve to determine one or more values of interest. The curve's maximum occurs at the most likely end-of-period cumulative value. In a Gaussian curve, the maximum is at the mean μ, as shown in FIG. 6. However, the curve is not necessarily Gaussian, and the most-likely value may be different than the mean. In a multi-mode distribution, there may be more than one local maximum (each local maximum is called a mode). Thus, values of interest to be determined by the computer may comprise the mean and the mode(s). Where a single-mode distribution is encountered, the values of interest may be the mean and the standard deviation σ. In some applications, the values of interest may define a range, e.g., a two-sided range around the most-likely value that contains 80% of the area under the curve. In other applications, the value of interest may be a probability of exceeding a target, as represented by the shaded area in FIG. 6. Each of these values of interest can be determined using numerical techniques.

In block 516, the computer displays the value(s) of interest to the user. In this manner, the user is provided with a forecast regarding the end-of-period value. The forecast display may take the form of an image on a screen or on paper, sound communicated audibly to the user, and/or a tactile pattern made sensible to the user. The forecast may simply be a most-likely end-of-period value. The forecast may comprise a standard deviation, a range, or some indication of confidence in the forecast value. The forecast may be a likelihood of exceeding (or failing to reach) a target value. The forecast may be a graph of the conditional probability density function for the end-of-period value. The foregoing examples are illustrative and not limiting.

The unconditional probability density functions calculated from previous periods may be saved for use by future forecasts in the current period. They can also be sequentially updated with the data acquired from the period that has just finished. Alternatively, rather than calculating unconditional probability density functions for the entire period and saving for future use, each execution of the program may instead determine the unconditional probability density functions at the points required for evaluating equation (5). For example, we can evaluate equation (5) on a weekly or other periodic basis.

The foregoing method is directed to forecasting values of interest relating to a cumulative attribute at the end of a period. However, the method can be readily modified to provide forecasting of any future value within the period. The derivation and mathematics proceed as before, with a simple substitution of $S_{t2}$ for $S_T$, where $t_2 \leq T$.

The above-described methods and systems may offer a number of advantages. The mathematics underlying the approach allow for forecasting at any time during the period, even when little or no information from the current period is available (e.g., at the beginning of the period). Such forecasting at the beginning of the period will not be subject to the instabilities that may be found in profile based methods, yet patterns (such as sharp-increases near the period's end) from previous periods will be extracted and incorporated in the forecasts. Conversely, the most current information is fully taken into account when making forecasts near the end of the period, and the forecast is guaranteed, in asymptotical and probability sense, to converge to the actual value. Also, the underlying mathematics allow for the use of judgment-calls in estimating probability density functions when little historical information is available. In addition, the mathematics provide flexibility in choosing the desired period(s) for forecasting. Further, the probability density functions for the intermediate values and for the end of the period can be determined separately, allowing for different determination methods to be used if, for example, the historical records for the end-of-period values are more complete.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of illustrative embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A processor-based method comprising:
   determining, by a processor, an unconditional probability density function (PDF) for a ratio of a cumulative attribute's current value to an associated future value for the cumulative attribute;
   determining, by the processor, an unconditional PDF for a future value of the cumulative attribute;
   combining, by the processor, the unconditional PDFs with a current value of the cumulative attribute to obtain a function indicative of a conditional PDF for the future value;
   operating, by the processor, on the function to obtain at least one forecast; and
   communicating the forecast to a user,
   wherein said combining comprises:
      finding a set of ratios by dividing the current value of the cumulative attribute by each of a set of potential future values;
      for each potential future value in said set of potential future values,
         evaluating the unconditional ratio PDF at the ratio associated with the potential future value;
         evaluating the unconditional future value PDF at the potential future value;
         multiplying the evaluated unconditional PDFs to determine a product; and
         dividing the product of the evaluated unconditional PDFs by the potential future value.

2. The method of claim 1, wherein said determining of the unconditional PDFs comprises:
   connecting to a database having historical records of the cumulative attribute for at least one period prior to a current period;
   combining data from multiple periods to estimate the unconditional PDFs.

3. The method of claim 2, wherein said determining further comprises normalizing a time scale of each period.

4. The method of claim 2, wherein said determining further comprises fitting a curve to cumulative attribute data from each period prior to the current period.

5. The method of claim 2, wherein said determining further comprises determining a probability distribution for the cumulative ratio at each time point in the period.

6. The method of claim 2, wherein the cumulative attribute is of a monetary value, and wherein the periods are fiscal periods.

7. The method of claim 1, wherein said function is proportional to $1/S_T f_{R_t}(S_t/S_T) f_{S_T}(S_T)$, where $S_t$ represents the cumulative attribute at a current time t, $S_T$ represents potential values of the cumulative attribute at a future time T, $f_{R_t}(S_t/S_T)$ represents a PDF for ratio $R_t = S_t/S_T$, and $f_{S_T}(S_T)$ represents a PDF for $S_T$.

8. The method of claim 1, wherein said operating comprises determining a future value that maximizes the function.

9. The method of claim 1, wherein said operating comprises determining a future value that is the average or median of the function.

10. The method of claim 1, wherein said operating comprises determining a value indicative of the standard deviation of the function.

11. The method of claim 1, wherein said operating comprises determining a percentage of area under the function that is associated with a range of potential future values.

12. The method of claim 1, wherein said communicating comprises displaying the forecast on a screen viewable by a user.

13. A computer comprising:
   a display;
   a processor coupled to the display; and
   a memory coupled to the processor,
   wherein the memory stores software that configures the processor to determine a forecast regarding a cumulative attribute's future value, and further configures the processor to show the forecast on the display, and
   wherein said forecast is based at least in part on determining a probability density function (PDF) for a ratio of the cumulative attribute's current value to an associated future value, and evaluating said ratio PDF at the ratios between the current attribute's current value and a range of the cumulative attribute's potential future values, wherein as part of determining the forecast, the software configures the processor to repeat a set of operations for each potential future value in a set of the cumulative attribute's potential future values, wherein the set of operations comprises:

evaluating the ratio PDF at a ratio associated with the potential future value;

evaluating the cumulative attribute's future value PDF at the potential future value; and dividing a product of the evaluated PDFs by the potential future value, and wherein the repeated set of operations yields a function proportional to the PDF for the cumulative attribute's future value.

14. The computer of claim 13, wherein as part of determining the forecast, the software configures the processor to determine one or more values indicative of $1/S_T f_{R_t}(S_t/S_T) f_{S_T}(S_T)$, where $S_t$ represents the cumulative attribute at a current time t, $S_T$ represents potential values of the cumulative attribute at a future time T, $f_{R_t}(S_t/S_T)$ represents a PDF for ratio $S_t/S_T$, and $f_{S_T}(S_T)$ represents a PDF for $S_T$.

15. A computer-readable medium storing software executable by a computer, such that execution of said software by the computer causes the computer to:

estimate probability density functions (PDFs) of a cumulative attribute's ratio to an associated future value at different times in a period based on a history of cumulative attribute values in past periods; and determine a forecast regarding the cumulative attribute's value, wherein said forecast is based at least in part on evaluating a PDF for the cumulative attribute's ratio at the ratios between the current attribute's current value and a range of the cumulative attribute's potential future values, wherein as part of determining the forecast, the software configures the computer to repeat a set of operations for each potential future value in a set of the cumulative attribute's potential future values, wherein the set of operations comprises:

evaluating the ratio PDF at a ratio associated with the potential future value:

evaluating the cumulative attribute's future value PDF at the potential future value; and dividing a product of the evaluated PDFs by the potential future value, and wherein the repeated set of operations yields a function proportional to the PDF for the cumulative attribute's future value.

16. The medium of claim 15, wherein the cumulative attribute is a measure of business performance.

17. The medium of claim 15, wherein the cumulative attribute is a monetary value from the set consisting of revenues, costs, and profits.

18. The medium of claim 15, wherein the software further configures the computer to communicate the forecast to a user.

19. The medium of claim 15, wherein as part of determining the forecast, the software configures the computer to determine one or more values represented by $1/S_T f_{R_t}(S_t/S_T) f_{S_T}(S_T)$, where $S_t$ represents the cumulative attribute at a current time t, $S_T$ represents potential values of the cumulative attribute at a future time T, $f_{R_t}(S_t/S_T)$ represents a PDF for ratio $S_t/S_T$, and $f_{S_T}(S_T)$ represents a PDF for $S_T$.

20. The medium of claim 15, wherein the forecast comprises a most likely end-of-period value and a confidence interval around the most likely end-of-period value.

21. A cumulative attribute forecasting apparatus comprising:

a processor;

a computer-readable data storage medium storing software that when executed by the processor causes the processor to:

determine an unconditional probability density function (PDF) for a ratio of accumulative attribute's current value to an associated future value for the cumulative attribute;

determine an unconditional PDF for a future value of the cumulative attribute;

combine the unconditional PDFs with a current value of the cumulative attribute to obtain a function indicative of a conditional PDF for the future value;

operate on the function to obtain at least one forecast; and communicating the forecast to a user, wherein the processor is to combine the unconditional PDFs with the current value by:

finding a set of ratios by dividing the current value of the cumulative attribute by each of a set of potential future values;

for each potential future value in said set of potential future values, evaluating the unconditional ratio PDF at the ratio associated with the potential future value;

evaluating the unconditional future value PDF at the potential future value;

multiplying the evaluated unconditional PDFs to determine a product; and dividing the product of the evaluated unconditional PDFs by the potential future value.

22. The apparatus of claim 21, further comprising a display to communicate the forecast to a user.

23. The apparatus of claim 21, wherein the conditional PDF is represented by $1/S_T f_{R_t}(S_t/S_T) f_{S_T}(S_T)$, where $S_t$ represents the cumulative attribute at a current time t, $S_T$ represents potential values of the cumulative attribute at a future time T, $f_{R_t}(S_t/S_T)$ represents a PDF for ratio $S_t/S_T$, and $f_{S_T}(S_T)$ represents a PDF for $S_T$.

* * * * *

UNITED STATES PATENT AND TRADEMARK OFFICE
CERTIFICATE OF CORRECTION

| | | |
|---|---|---|
| PATENT NO. | : 7,797,184 B2 | Page 1 of 1 |
| APPLICATION NO. | : 10/959861 | |
| DATED | : September 14, 2010 | |
| INVENTOR(S) | : Jerry Z. Shan et al. | |

It is certified that error appears in the above-identified patent and that said Letters Patent is hereby corrected as shown below:

In column 9, lines 10-13, in Claim 13, delete
"dividing a product of the evaluated PDFs by the potential
    future value, and wherein the repeated set of
    operations yields a function proportional to the
PDF for the cumulative attribute's future value."
and insert
-- dividing a product of the evaluated PDFs by the potential
    future value, and wherein the repeated set of
    operations yields a function proportional to the PDF for the
    cumulative attribute's future value. --, therefor.

In column 9, line 41, in Claim 15, delete "value:" and insert -- value; --, therefor.

Signed and Sealed this
Fifteenth Day of March, 2011

David J. Kappos
*Director of the United States Patent and Trademark Office*